US006084888A

United States Patent [19]
Watanabe et al.

[11] Patent Number: 6,084,888
[45] Date of Patent: Jul. 4, 2000

[54] COMMUNICATION METHOD AND COMMUNICATION EQUIPMENT

[75] Inventors: Kouji Watanabe, Kokubunji; Tomoaki Ishifuji, Suginami-ku, both of Japan

[73] Assignee: Hitachi, Ltd., Tokyo, Japan

[21] Appl. No.: 09/034,018

[22] Filed: Mar. 2, 1998

[30] Foreign Application Priority Data

Mar. 5, 1997 [JP] Japan ................................. 9-050028

[51] Int. Cl.[7] .............................. H04J 3/24; H04J 3/12
[52] U.S. Cl. ...................... 370/473; 370/474; 370/535; 370/522; 371/37.7
[58] Field of Search ............................ 370/331, 349, 370/395, 471, 473, 474, 476, 394, 477, 389, 242, 336, 522, 535; 371/37.01, 37.7

[56] References Cited

U.S. PATENT DOCUMENTS

| | | | |
|---|---|---|---|
| 4,920,534 | 4/1990 | Adelmann et al. | 370/474 |
| 5,227,876 | 7/1993 | Cucchi et al. | 370/535 |
| 5,345,451 | 9/1994 | Uriu et al. | 371/37.7 |
| 5,530,693 | 6/1996 | Averbuch et al. | 370/331 |
| 5,703,882 | 12/1997 | Jung et al. | 370/474 |
| 5,774,469 | 4/1998 | Wirkestrand | 370/473 |

*Primary Examiner*—Chua Nguyen
*Assistant Examiner*—Phuong Chua Ba Nguyen
*Attorney, Agent, or Firm*—Antonelli, Terry, Stout & Kraus, LLP

[57] ABSTRACT

An object of the present invention is to improve transmission efficiency of a communication system for forming a transmission frame from a plurality of packets to perform communications using the transmission frame and reduce transmission power required to maintain an error rate. Headers of the plurality of packets are coupled to each other with redundancy information deleted therefrom so as to form a header part of the transmission frame. Further, payloads of the plurality of packets are coupled to each other so as to form a payload part of the transmission frame. A forward error correction code used for the header part and a forward error correction code used for the payload part are respectively attached to the transmission frame in isolation.

11 Claims, 11 Drawing Sheets

COMMUNICATION METHOD AND COMMUNICATION EQUIPMENT

BACKGROUND OF THE INVENTION

1. Field of the Invention

The present invention relates to a communication system using a packet typified by an ATM (Asynchronous Transfer Mode) communication, and particularly to a communication system capable of implementing communications based on low transmission power while maintaining a necessary error rate.

2. Description of the Related Art

A transmission error is apt to intrinsically occur in wireless communications. Therefore, a system for effecting an error correction to a payload part as well as to a header part of an ATM cell has been proposed. At this time, an error correction stronger than that for the payload part is made to the header part to lessen the abandonment of a cell due to the occurrence of an error in a header thereof. For example, a system for respectively effecting a RS (Reed-Solomon) triple error correction and a RS single error correction on a header part of each ATM cell and a payload part thereof has been described in the reference "Watanabe, Ueno, Aikawa, and Matsue 'Code Error Transmission Characteristics in Wireless ATM' at Communication Society Meeting of The Institute of Electronics, Information and Communication Engineers (Japan), B-474 in 1996".

The ATM cell is a kind of packet and comprises a header part including information about a destination and attribute thereof, etc., and a payload part including the original information to be transmitted. Five bytes and forty-eight bytes are respectively assigned to them in accordance with the International Standard Specification.

When it is desired to transmit a packet through a communication channel, a frame is comprised of at least one packet and the frame is transmitted. FIG. 11 shows the structure of a common transmission frame. The transmission frame comprises a preamble 1 and data 200. The data 200 comprises a header 2, a payload 3, and a forward error correction (FEC) code for correcting a transmission error of both or one of the header 2 and the payload 3 or a cyclic redundancy check (CRC) code 4 for detecting the transmission error of both or one of the header 2 and the payload 3.

One frame is formed with at least one packet or ATM cell coupled thereto. FIG. 12 shows a conventional frame structure in which one frame is comprised of n packets. n packets 9, 10, . . . , 12 are stored in a payload 7 of the frame and a header 6 and an FEC (CRC) code 8 are added to the frame.

In a system for forming a frame for each packet and transmitting the formed frame in packet communications in which the amount of information per packet is less, the preamble 5, the header 6 and the forward error correction code or cyclic redundancy check code 8 of the transmission frame are large in overhead with respect to the payload 7 of the transmission frame and the efficiency of its transmission is poor.

In a system for compiling a plurality of packets into a transmission frame on the other hand, if the number of correction bytes increases to cope with errors produced in a frame transmission zone, then the forward error correction code increases in number and a larger number of transmission bands are required. As the transmission band increases with an increase in the overhead of the forward error correction code 8, the preamble 5 and the header 6 of the transmission frame with respect to the payload 7 of the transmission frame, transmission power required to maintain a desired error rate increases. However, no consideration has been given to a reduction in the increase in transmission power.

It is already known that a technique for coupling a plurality of packets to each other as they are to form a transmission frame, newly forming a network header and adding it to the transmission frame has been disclosed in Japanese Patent Laid-Open (Kokai) No. Hei 2-166856. This technique has a problem in that the number of bytes increases due to the further addition of new information to each packet.

It is also already known that a technique for coupling packets to each other to form a transmission frame whereas eliminating headers of packets only when the packets identical in header to each other appear, has been disclosed in Japanese Patent Laid-Open (Kokai) No. Hei 8- 32593. As compared with the aforementioned technique, this technique brings about an advantageous effect in that the number of bytes is reduced by the number of the eliminated headers. However, since the reduction in the number of bytes is limited only to the case in which the headers become the same, limitations are imposed on the advantageous effect.

SUMMARY OF THE INVENTION

In order to achieve an object of the present invention, there is provided a communication method employed in a communication system comprising a base station for transmitting and receiving data through packets each having a header part and a payload part, and a terminal station for communicating with the base station through a wireless channel or a wired channel, wherein the base station communicates with the terminal station through a transmission frame comprised of a plurality of packets, and the transmission frame has a preamble, a frame header part comprised of headers of the plurality of packets, a frame header part error correction code, a frame payload part comprised of payloads of the plurality of packets, and a frame payload part error correction code.

Since the frame header part that makes up the major portion of information added to the transmission frame in terms of the number of bytes, is formed by the headers of the packets, the number of the bytes results in a slight increase, thereby making it possible to solve the problems of the prior arts.

It is desirable that when pieces of information about VPI, VCI, HEC and the region (to be described later), which constitute the header of each packet, overlap each other, the overlapping information are deleted and the frame header part is formed by information inherent in each packet. A further reduction in the number of bytes can be realized.

These and other objects and many of the attendant advantages of the invention will be readily appreciated as the same becomes better understood by reference to the following detailed description when considered in connection with the accompanying drawings.

BRIEF DESCRIPTION OF THE DRAWINGS

The present invention will now be described with reference to the accompanying drawings wherein.

DETAILED DESCRIPTION OF THE PREFERRED EMBODIMENTS

A preferred embodiment of the present invention will hereinafter be described in detail with reference to the accompanying drawings.

Figure 1:
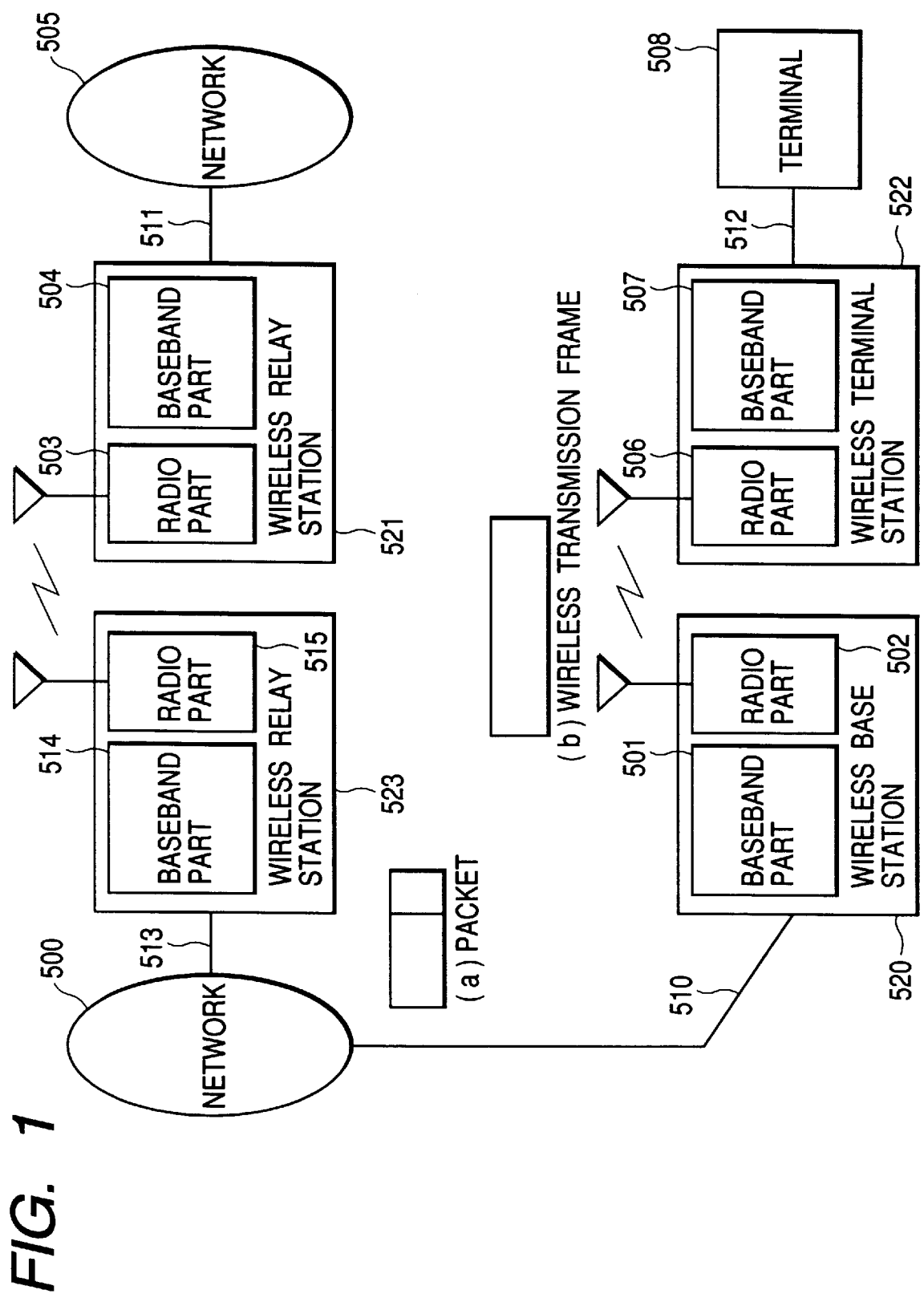
FIG. 1 is a block diagram showing a communication network to which a communication system according to the present invention is applied.

FIG. 1 shows one example of a communication network to which a communication system according to the present invention is applied. A wireless base station 520 is connected to a first network 500 through a wired interface 510, whereas a wireless relay station 523 is connected to the first network 500 through a wired interface 513. A wireless relay station 521 is connected to a second network 505 through a wired interface 511. A terminal 508 is connected to a wireless terminal station 522 through a wired interface 512.

The present invention is applied to a construction of a transmission frame employed in a wireless zone between the wireless terminal station 522 and the wireless base station 520 or between the wireless relay station 523 and the wireless relay station 521. Now consider, as an example, where a transmission frame is transmitted from the terminal 508 to the wireless base station 520. The terminal 508 transmits a packet to the wireless terminal station 522. A baseband part 507 analyzes the contents of a header of the packet and constitutes a transmission frame for each destination. The transmission frame is transmitted from a radio part 506 and received by a radio part 502 of the wireless base station 520. A baseband part 501 corrects an error in the transmission frame and converts the corrected transmission frame to a packet.

Figure 2:
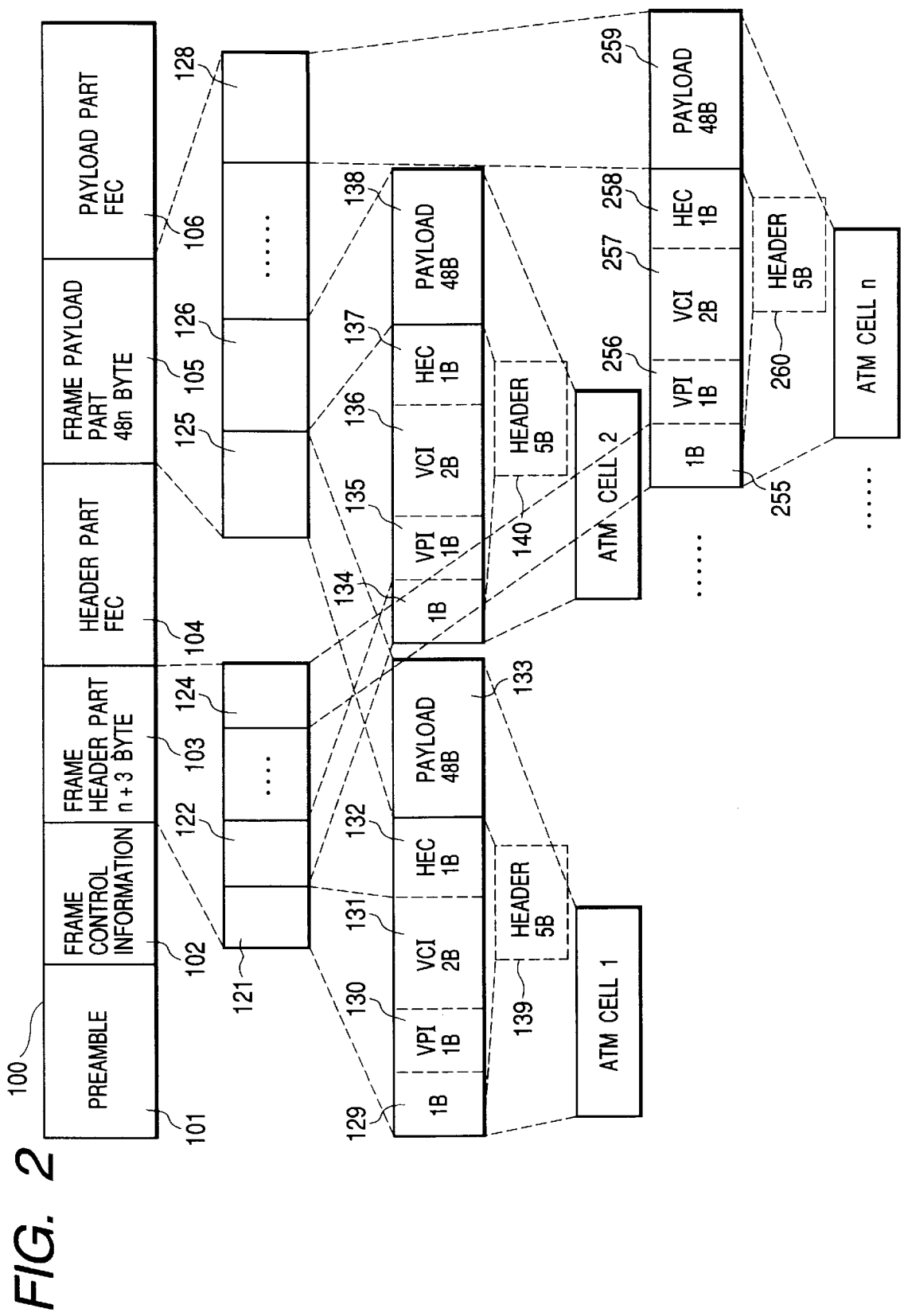
FIG. 2 is a configurational diagram illustrating an example of a transmission frame comprised of a plurality of ATM cells.

A transmission frame according to the present invention will be described with reference to FIG. 2 by taking, as an example, where a communication network communicates in accordance with an ATM protocol.

An ATM cell comprises a total of 53 bytes which consists of 5 bytes used for a header 139 (whose reference numeral is used in an ATM cell 1) and 48 bytes used for a payload 133 for storing therein information that a user desires to transmit. The header 139 has a 1-byte VPI (Virtual Path Identifier) 130, a 2-byte VCI (Virtual Channel Identifier) 131, a 1-byte HEC (Header Error Control) 132 and a 1-byte region 129 with other information stored therein. The region 129 includes information about generic flow control (GFC), a payload type and cell loss priority (CLP). A destination for the ATM cell is represented by VPI/VCI.

As described in relation to FIG. 1, the baseband part of the wireless terminal station (wireless base station or wireless relay station) compiles n ATM cells every destinations into one transmission frame and performs frame transmission through the radio zone. A transmission frame 100 according to the present invention will be explained.

The transmission frame 100 includes a preamble 101 used for establishing the frame synchronism, frame control information 102, a frame header part 103, a frame header part forward error correction code 104, a frame payload part 105 and a frame payload part forward error correction code 106.

The header part 103 is assembled from VPI/VCI extracted from any (ATM cell 1 in the drawing) of ATM cells and regions extracted from the respective ATM cells. The VPI/VCI are the same every cells constituting each transmission frame and the HEC is deleted to provide the header part forward error correction code 104. The assembling of the header part from the regions extracted from the respective cells permits the transmission of header information inherent in the respective cells while the header information are being held.

The payload part 105 is made up of payloads extracted from the respective ATM cells.

Namely, a portion 121 of the header part 103 consists of the region 129 of the header 139 for the ATM cell 1 and the VPI 130 and VCI 131. A portion 122 thereof is equivalent to a region 134 in a header 140 and a portion 124 thereof corresponds to a region 255 in a header 260 of an ATM cell n. A portion 125 of the payload part 105 corresponds to the payload 133 of the ATM cell 1, a portion 126 thereof corresponds to a payload 138 of an ATM cell 2, and a portion 128 thereof corresponds to a payload 259 of the ATM cell n.

Owing to the construction of such a transmission frame, 3(n−1)+n bytes can be omitted from the header part. Further, the transmission frame 100 separately performs an error correction to the header part 103 and the payload part 105 (104 and 106). There are two reasons for this. In other words, one lies in that since the entire transmission frame or error-produced ATM cells are inevitably abandoned when an error occurs in the corresponding header part, it is desirable to make an error correction stronger than that for the payload part in error correction force, to the header part. Another lies in that the numbers of error correction bytes for them are respectively suitably determined to thereby optimize transmitting power for the transmission frame. In regard to the latter, simulated results will be explained later.

The frame control information 102 will be described later.

Figure 3:
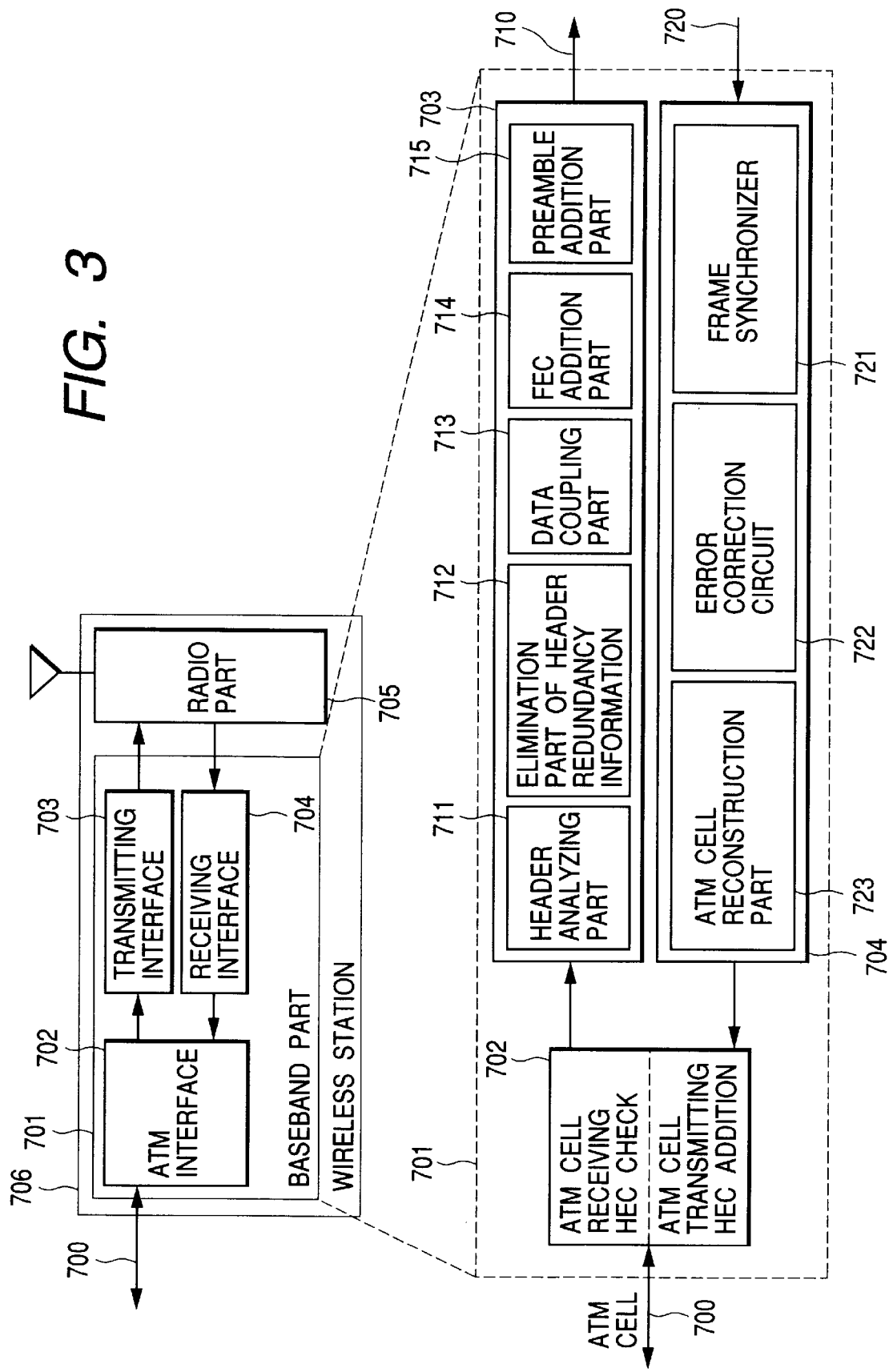
FIG. 3 is a functional block diagram of a wireless station.

FIG. 3 is a functional block diagram of a wireless station. A wireless station 706 is common in configuration to any of the wireless base station 520, the wireless terminal station 522 and the wireless relay stations 521 and 524. A baseband part 701 corresponds to a portion for performing baseband signal processing and includes functional blocks of an ATM interface 702, a transmitting interface 703 and a receiving interface 704. A radio part 705 performs analog processing on a baseband signal processed by the baseband part 701 and outputs the processed signal through an antenna.

An ATM cell inputted from a wired interface 700 is received by the ATM interface 702 where a HEC check is made thereto. If each ATM cell header is found not to reveal an error, then the transmitting interface 703 assembles a transmission frame. A header analyzing part 711 analyzes the ATM cell headers to distinguish cells from each other according to VPI/VCI or VPI/VCI/cell loss priority representations. In regard to a cell assembly corresponding to the same VPI/VCI, an elimination part of header redundancy information 712 eliminates redundancy information and HEC from the header of each ATM cell. A data coupling part 713 compiles headers of cells with no redundancy information and HEC so as to constitute a header part 103 of the transmission frame and integrates cell payloads into a payload part 105 of the transmission frame. An FEC addition part 714 adds an FEC 104 to the header part 103 of the transmission frame and an FEC 106 to the payload part 105 thereof. A preamble addition part 715 adds a preamble 101 for synchronism to constitute a transmission frame 100. The transmission frame 100 is sent to the radio part 705 through a transmission line 710.

On the other hand, the transmission frame received by the radio part 705 is inputted to the receiving interface 704 through a transmission line 720. A frame synchronizer 721 establishes frame synchronism. An error correction circuit 722 performs an error correction to the header part of the transmission frame, based on information about the header part 103 and the header part forward error correction 104 and also effects an error correction on the payload part of the transmission frame, based on information about the payload part 105 and the payload part forward error correction 106. An ATM cell reconstruction part 723 divides the error-corrected frame header part 103 into headers (121, 122, . . . , 124) in cell units and also separates the frame payload part 105 into payloads (125, 126, . . . , 128) in cell units. Upon transmission, the ATM cell reconstruction part 723 inserts the information eliminated by the elimination part of header redundancy information 712 into the transmission frame (adds VPI/VCI corresponding to destination information to each individual cell in FIG. 2 by way of example) to thereby reconstruct ATM cells excluding HEC. The ATM interface 702 adds HEC for each ATM cell header and transmits the corresponding ATM cell through the wired interface 700.

Figure 4:
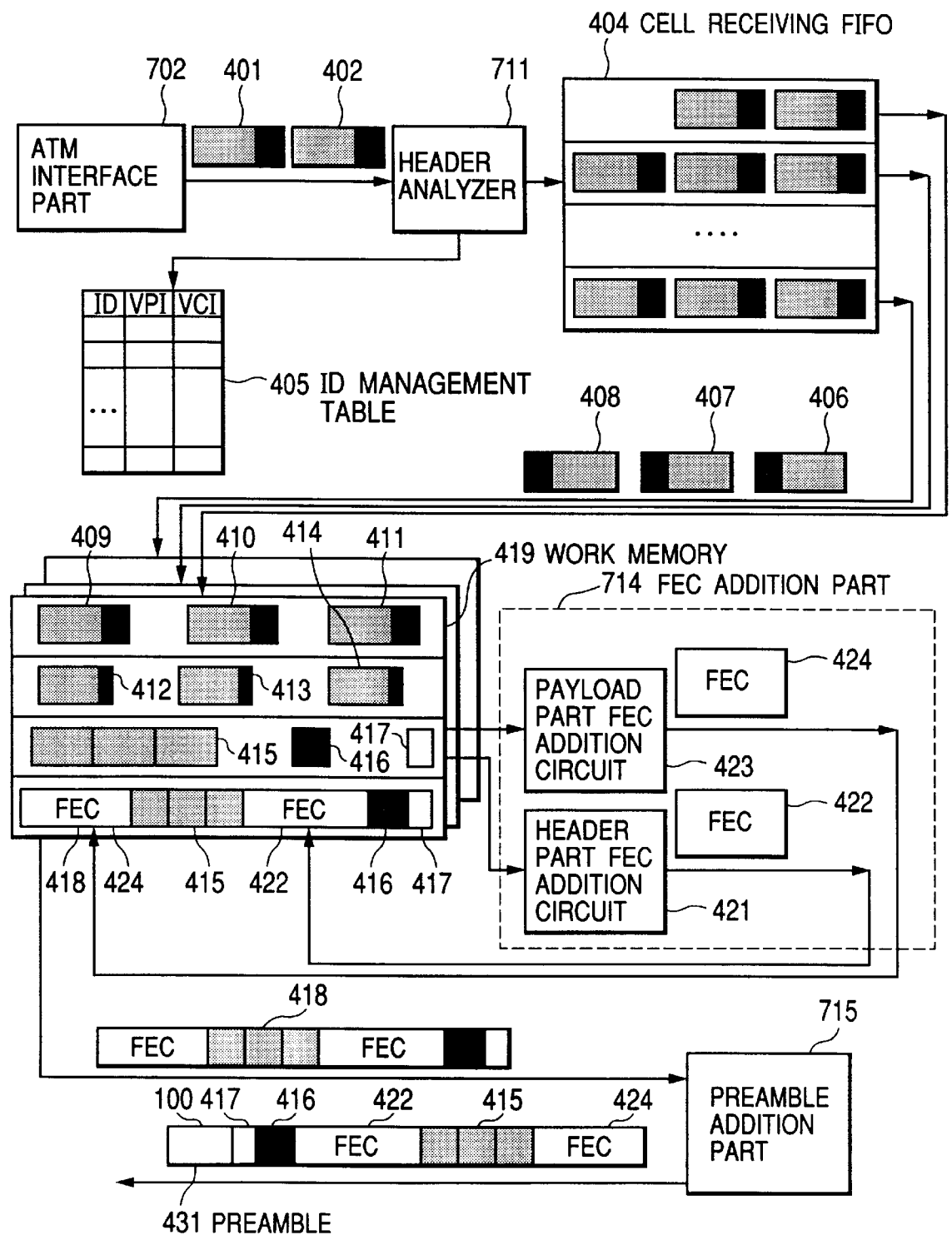
FIG. 4 is a block diagram depicting a circuit for constituting a frame employed in a transmitting interface of a wireless station.

One embodiment of the transmitting interface 703 shown in FIG. 3 will be explained in detail with reference to FIG. 4. In the present embodiment, the number n of ATM cells that constitute a transmission frame, is set to 3.

The ATM interface 702 outputs ATM cells 401 and 402 therefrom. The header analyzing part 711 checks VPI/VCI of each ATM cell against VPI/VCI registered in a ID (IDentifier) management table 405. Here, the ID management table 405 is one for assigning corresponding IDs to VPI/VCI so as to manage destinations for the ATM cells. If an ATM cell having VPI/VCI unregistered in the ID management table 405 is detected, then an ID corresponding to the unregistered VPI/VCI is determined and thereafter registered in the ID management table 405. The ATM cells are stored in a cell receiving FIFO 404 comprised of an FIFO-type memory every IDs. n (n=3 in the drawing) ATM cells are read from the cell receiving FIFO 404 at predetermined time intervals every IDs and written into their corresponding work memories 419 corresponding to IDs. If the n ATM cells are found not to be stored in the corresponding cell receiving FIFO 404 upon reading the ATM cells from the cell receiving FIFO 404, then dummy cells making up for insufficient cells are inserted therein so as to be read as n ATM cells in total.

The work memories 419 are provided so as to correspond to IDs and are used to eliminate header redundancy information and HEC and link data to each other. In the drawing, the work memory 419 is represented in the form of four stages according to the progress of processing. In the n ATM cells (first stage) inputted to the work memory 419, header redundancy parts are eliminated therefrom (second stage), a portion 416 with headers coupled to each other and a portion 415 with payloads coupled to each other are assembled into one and frame control information 417 is generated (third stage). The frame control information 417 includes a sequence number for the transmission frame as well as the positions of dummy cells when the dummy cells are included in the ATM cells.

Error correction codes are respectively generated for the assembled headers and payloads. An FEC addition part 714 is provided with a header part FEC addition circuit 421 and a payload part FEC addition circuit 423. The header part FEC addition circuit 421 calculates an FEC 422 for a portion linked between the assembled header part 416 and the frame control information 417. The payload part error FEC addition circuit 423 calculates an FEC 424 from the assembled payload part 415. The outputs 422 and 424 of the FEC addition part 714 are written into their corresponding work memory 419 so as to assemble a frame 418 excluding a preamble (fourth stage). A preamble addition part 715 adds a preamble 431 to the frame 418 so as to constitute the transmission frame 100 shown in FIG. 2.

Figure 5:
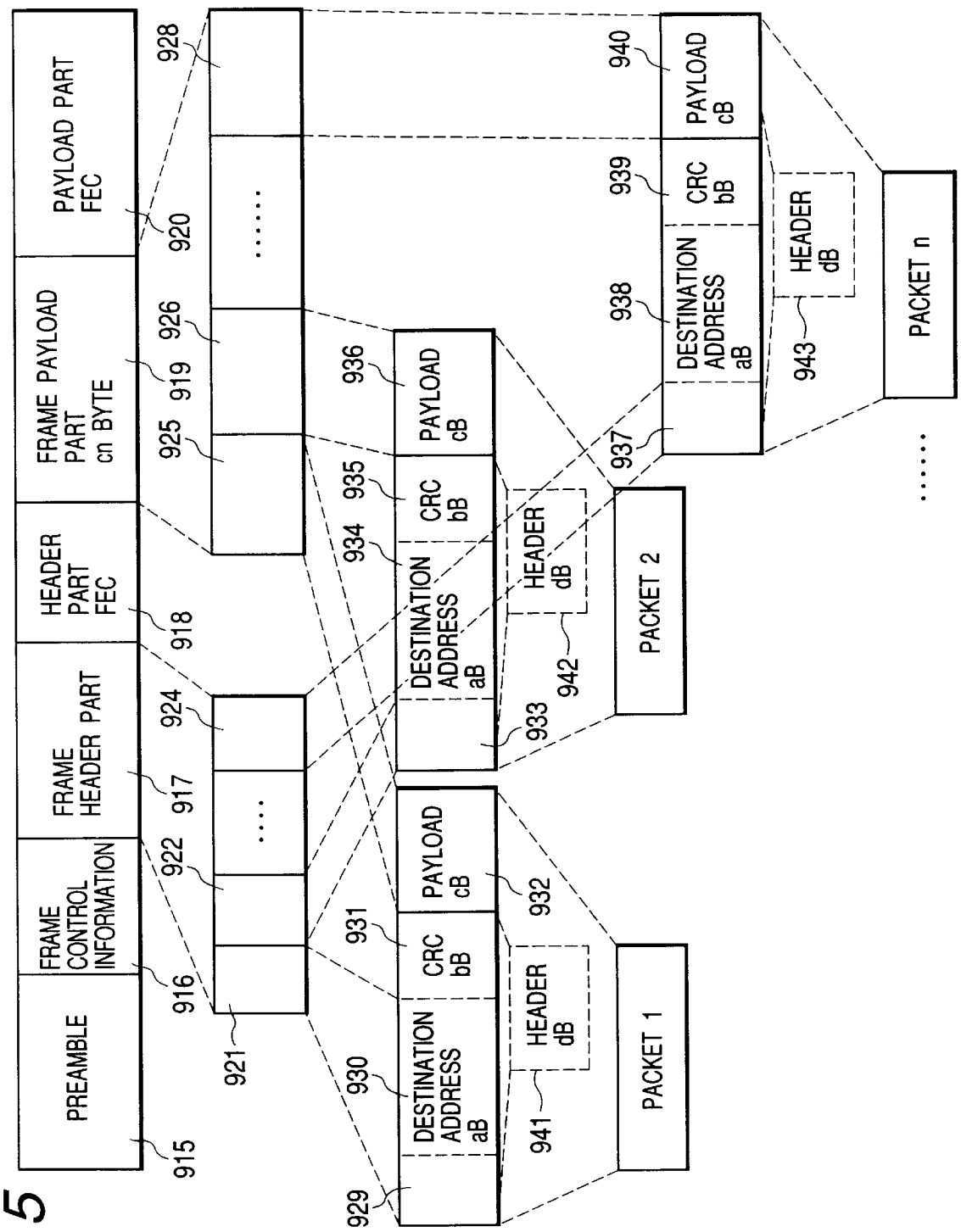
FIG. 5 is a configurational diagram showing an example of a transmission frame comprised of a plurality of packets.

Incidentally, the transmission frame according to the present invention can be applied even to a general packet transmission system other than a transmission system in which a communication network is based on ATM cells. A transmission frame 900 comprised of n packets is shown in FIG. 5. As compared with the case in which the transmission frame comprises the ATM cells shown in FIG. 2, VPI and VCI are equivalent to those replaced by destination addresses. At this time, CRC b bytes of headers and destination address a bytes thereof excluding a packet 1 are deleted from the respective packets. nb+a(n-1) bytes are eliminated in total. CRC may be FEC.

Figure 6:
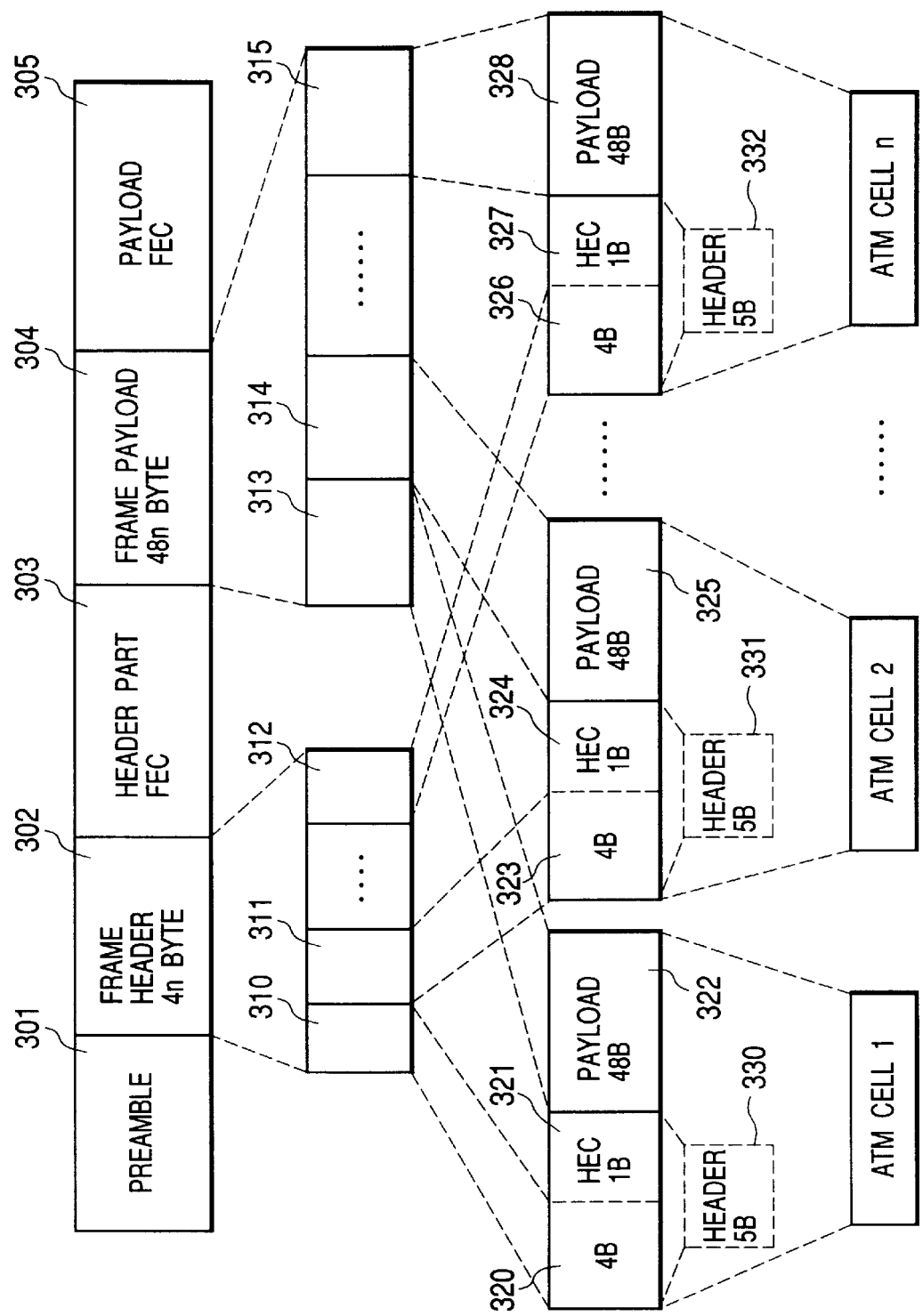
FIG. 6 is a configurational diagram illustrating another example of a transmission frame comprised of a plurality of ATM cells.

FIG. 6 shows an example in which a transmission frame is constructed exclusive of only HEC of headers in respective ATM cells.

Figure 7:
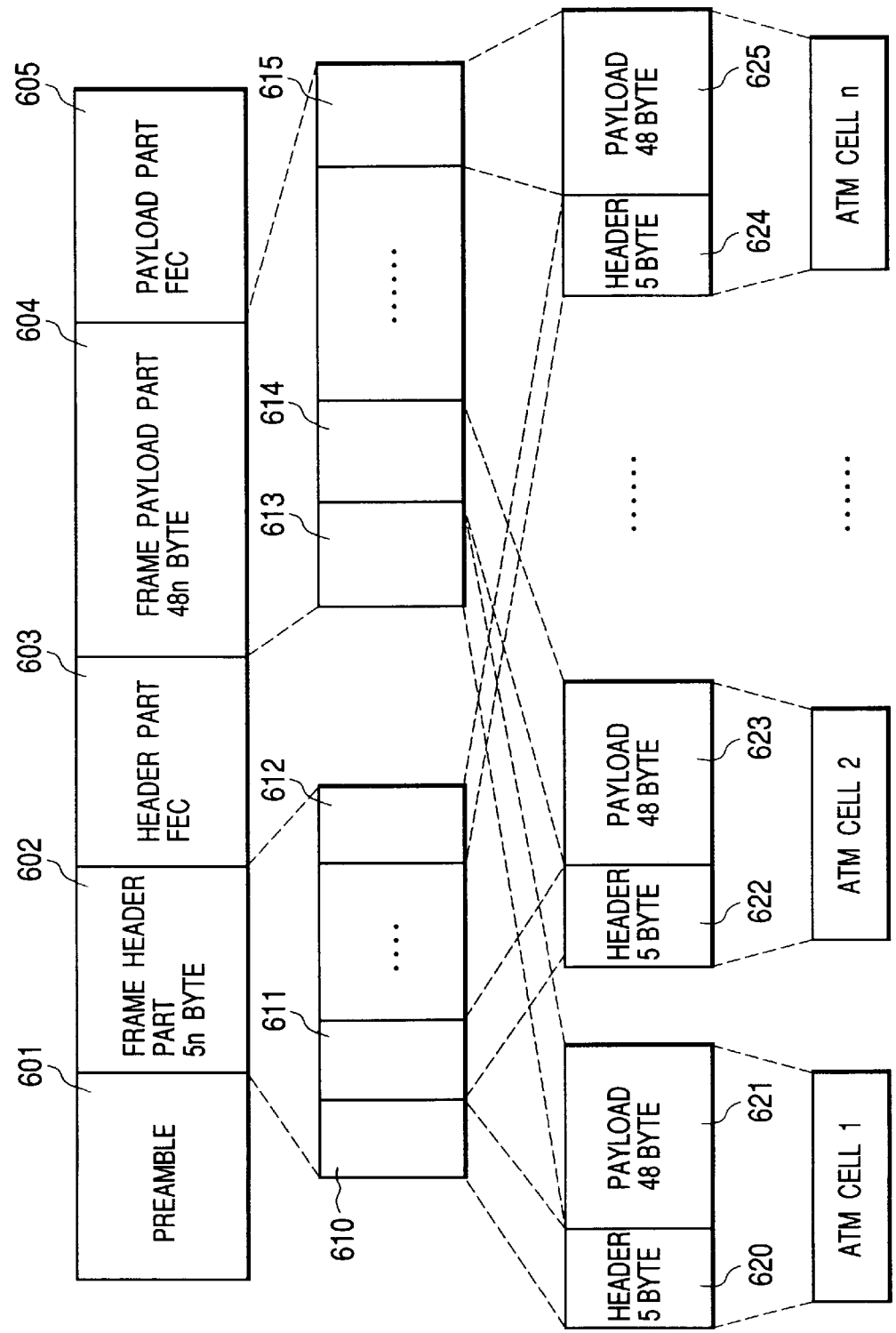
FIG. 7 is a configurational diagram depicting a further example of a transmission frame comprised of a plurality of ATM cells.

Further, FIG. 7 illustrates an example in which a transmission frame is configured with redundancy information of headers left behind without deletion. Headers 620, 622 and 624 of respective ATM cells are transferred to their corresponding parts 610, 611 and 612 of a frame header part 602 as they are.

With the transmission frame shown in FIG. 6 taken as an example, a description will now be made of a case in which the transmission frame according to the present invention is made up of a plurality of ATM cells and transmitted through radio zones, whereby transmission power required to meet a predetermined error rate is reduced due to the formation of the transmission frame by the plurality of ATM cells.

Assume where $t_H$ byte and tp byte corrections are respectively made to headers and payloads according to RS codes with a preamble length as a k byte. In this case, FEC (Forward Error Correction) of the header and FEC of the payload need $2t^H$ bytes and 2tp bytes respectively. Carrier power S can be expressed as the following equation (1):

$$S = \frac{S}{N}N = \frac{E_b f_b}{N_0 B}N \qquad (1)$$

where S: carrier power (W)

N: noise power (W)

$E_b$: power per bit (W)

$N_0$: power spectral density of noise (W/Hz)

B: noise bandwidth (Hz)

$f_b$: bit rate

Assuming now that the temperature is constant, the power spectral density of the noise No becomes constant. If a bandwidth to be cut by a radio part is constant, then the noise bandwidth B can be supposed to be constant and hence a variable related to the noise takes a constant value. Now the bit rate $f_b$ can be replaced with a constant multiple of an increase ratio Rb between bands based on the preamble and the error correction as the following equation (2):

$$f_b = \text{Const} \times Rb, \quad Rb = \frac{48n + 2t_p + 4n + 2t_H + k}{48n + 4n} \quad (2)$$

Assuming differential detection of BPSK (Binary Phase Shift Keying) or QPSK (Quadrature Phase Shift Keying), a bit error rate of a modem signal can be represented as the following equation (3):

$$P_b = \frac{1}{2} e^{-E_b/N_0} \quad (3)$$

The carrier power S is expressed as the following equation (4) from the equations (1), (2) and (3):

$$S = \text{Const} \times \ln(2P_b) \times Rb \quad (4)$$

When the header is different from the payload in required bit error rate, transmission powers $S^H$ and $S^P$ necessary for the transmission of the header and payload parts can be given by the following equations (5) and (6):

$$S^H = \text{Const} \times \ln(2P_b^H) \times Rb \quad (5)$$

$$S^P = \text{Const} \times \ln(2P_b^P) \times Rb \quad (6)$$

Incidentally, $P_b^H$ shown in the equation (5) and $P_b^P$ shown in the equation (6) respectively indicate bit error rates required for the header and payload parts prior to the error corrections. These are determined from bit error rates required posterior to the error correction and the strength or power of the error correction to be executed.

Figure 8:
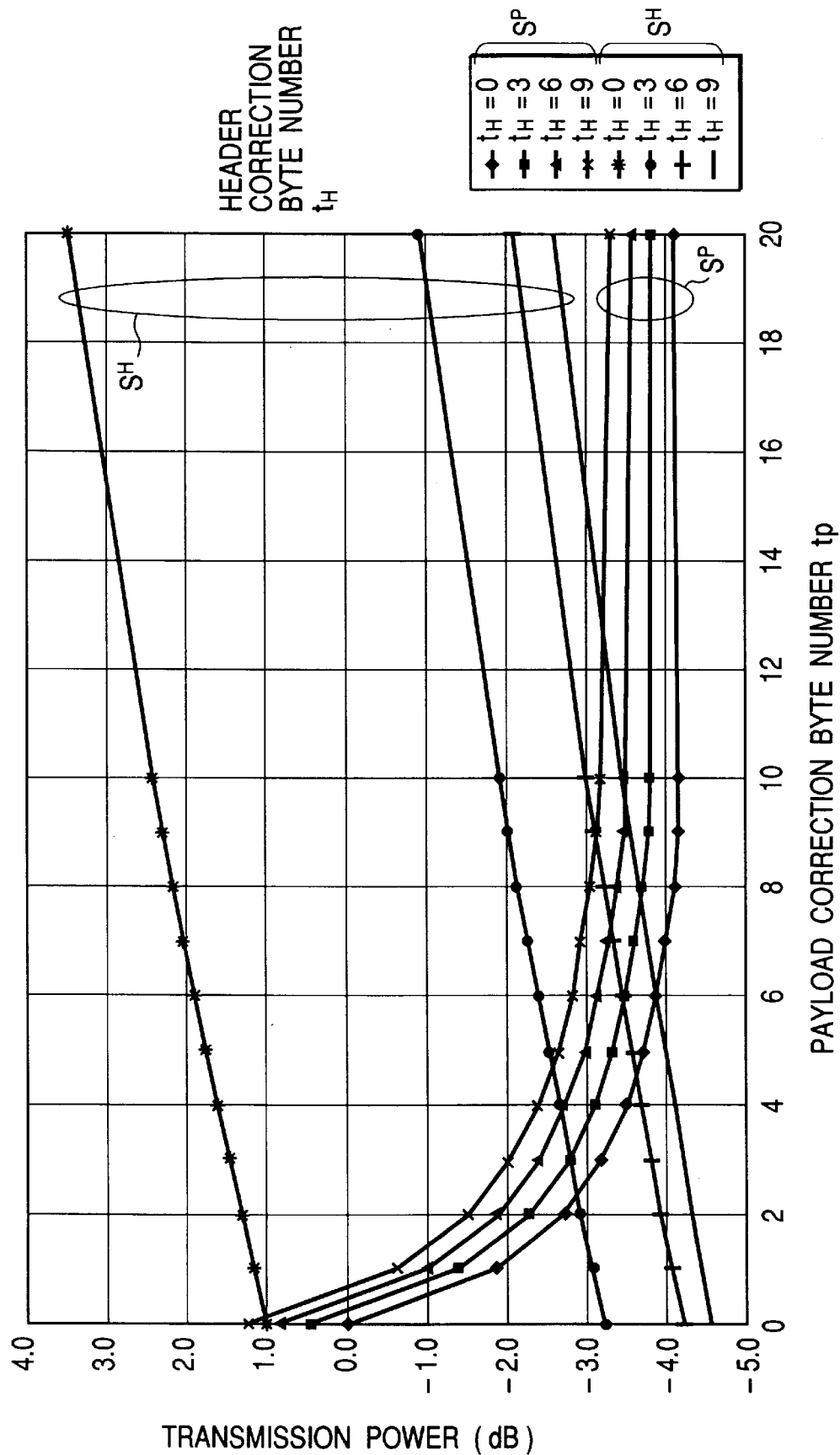
FIG. 8 is a curved diagram showing carrier power at the time that a transmission frame is made up of an ATM cell.
Figure 9:
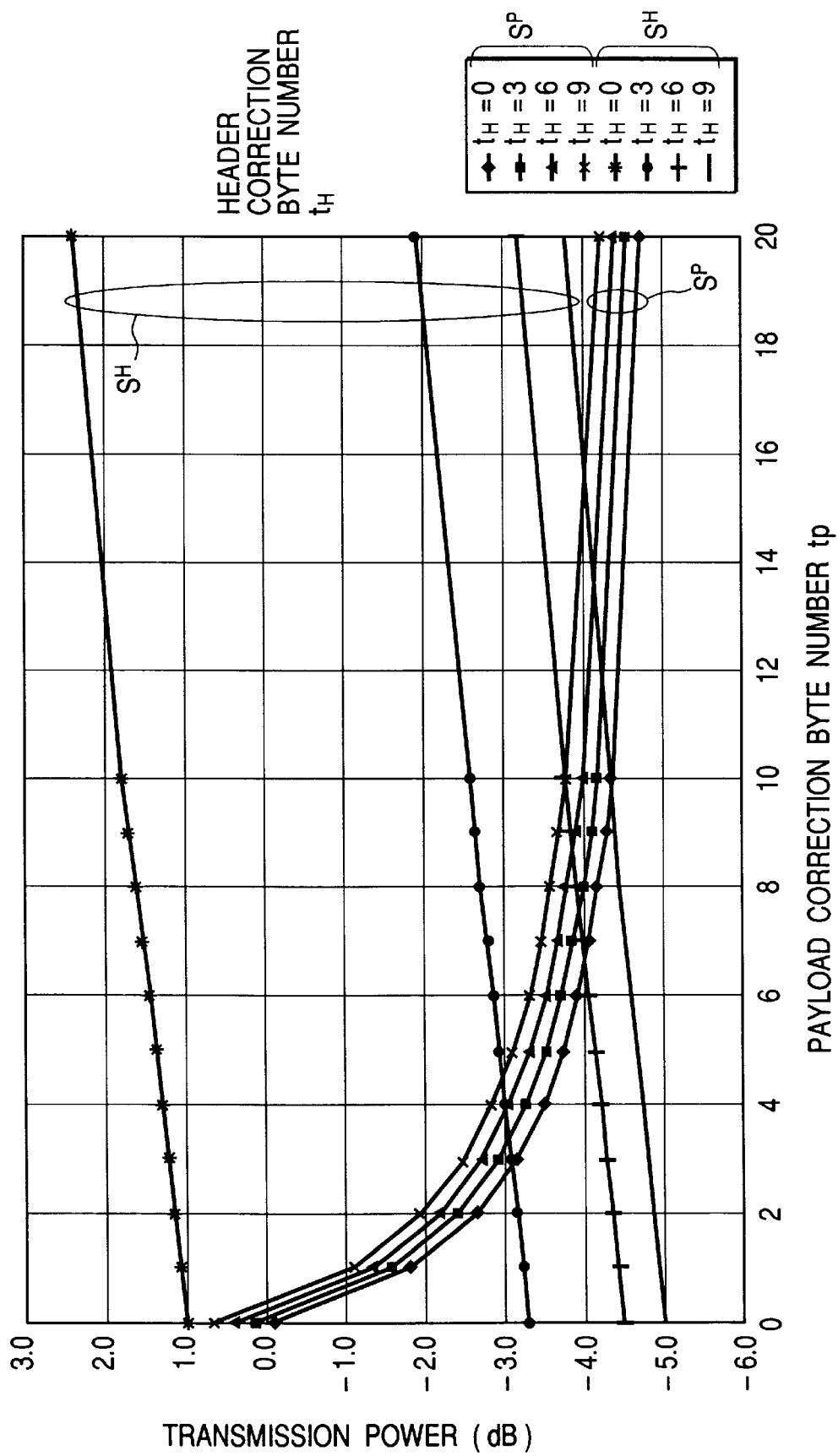
FIG. 9 is a curved diagram illustrating carrier power at the time that the transmission frame consists of two ATM cells.
Figure 10:
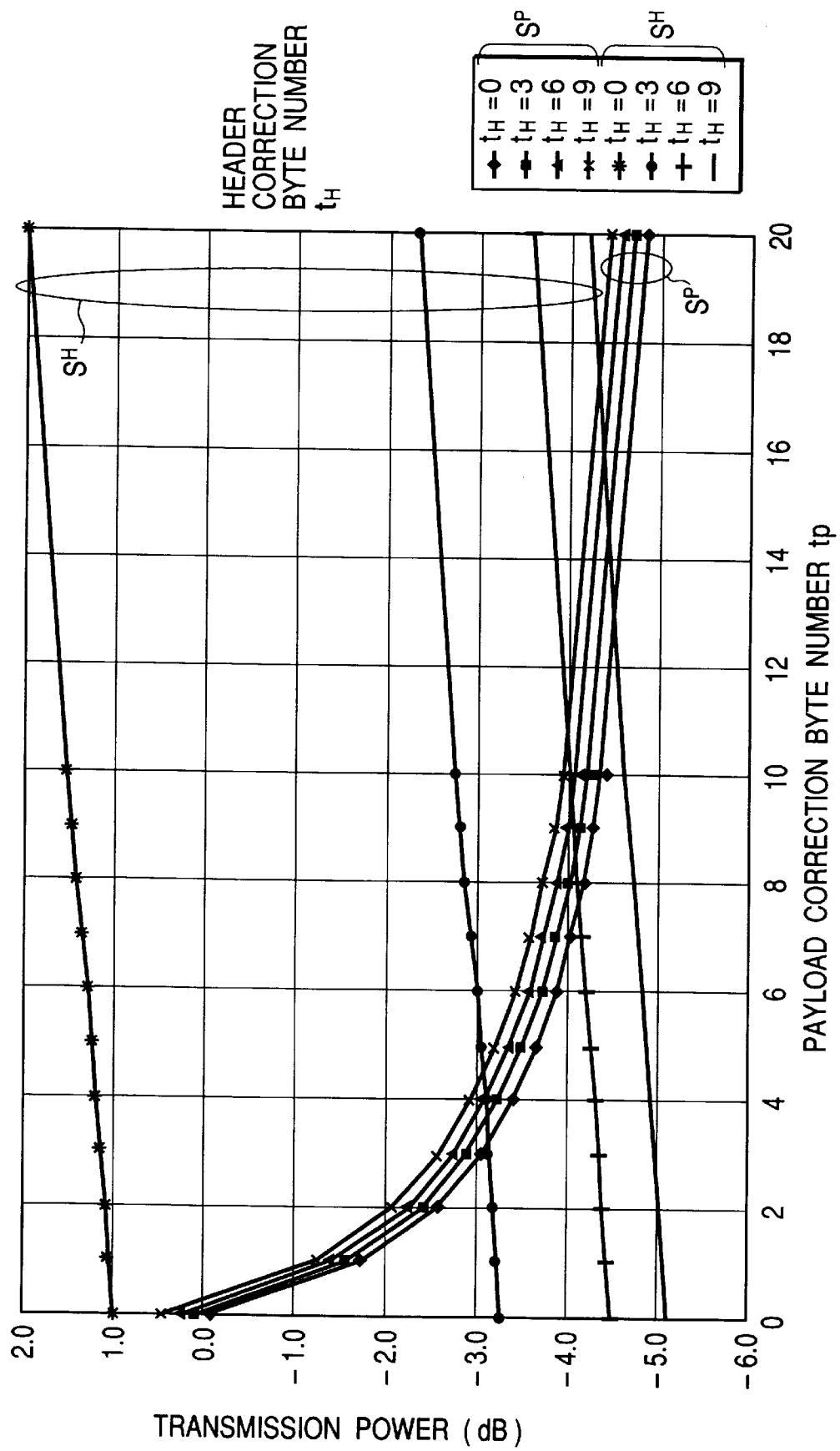
FIG. 10 is a curved diagram depicting carrier power at the time that the transmission frame comprises three ATM cells.
Figure 11:
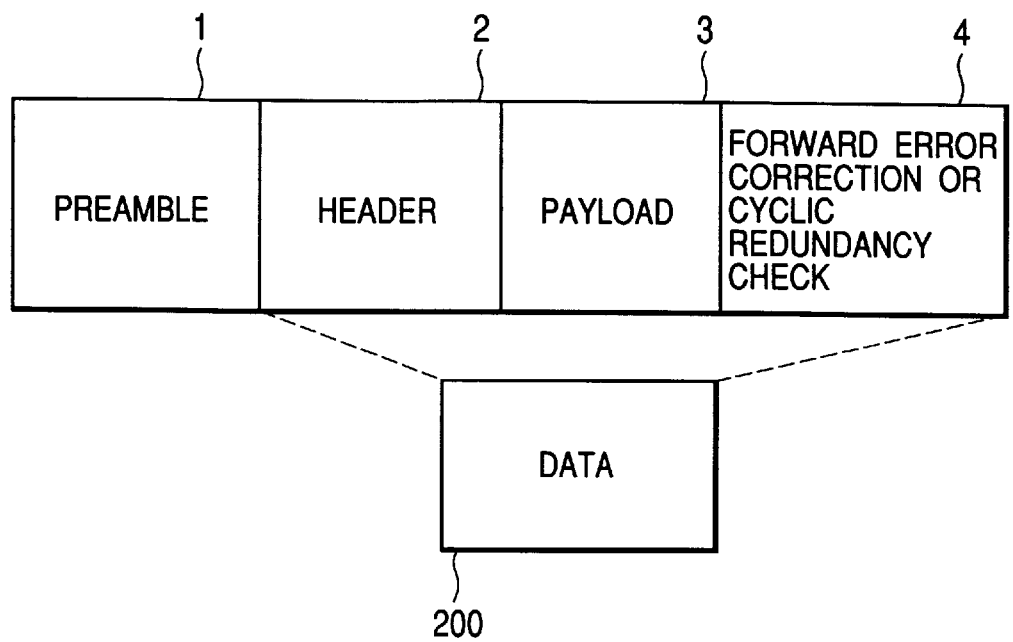
FIG. 11 is a configurational diagram showing an example of a conventional frame.
Figure 12:
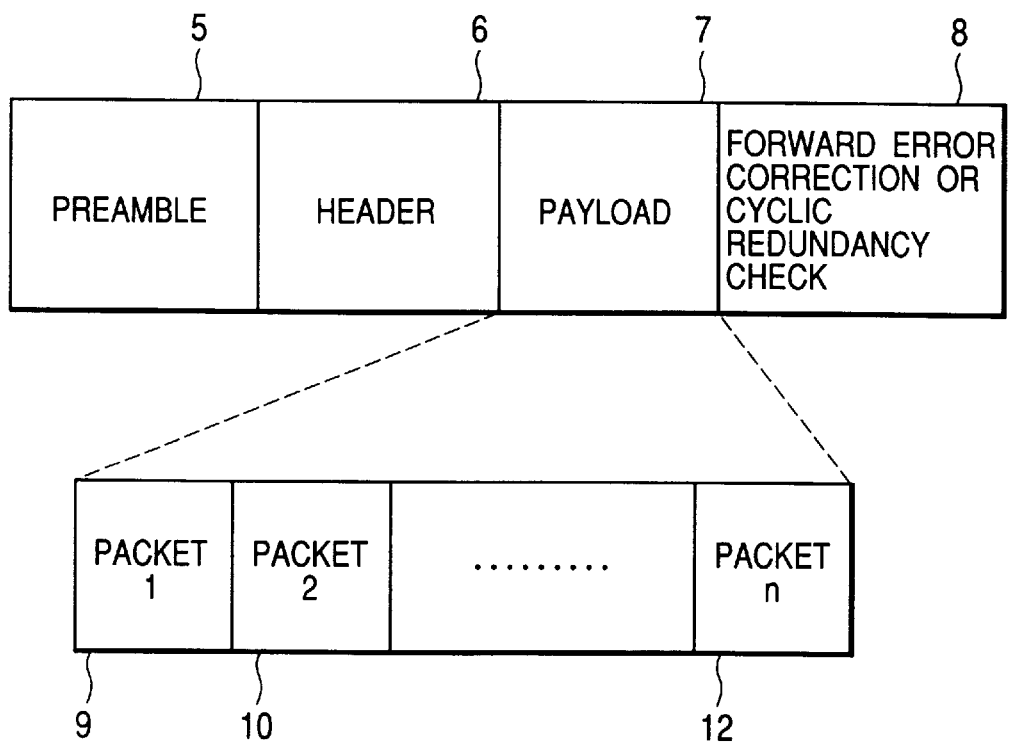
FIG. 12 is a configurational diagram illustrating an example of a conventional frame comprised of a plurality of packets.

Calculated values shown below are those obtained by standardizing the constant (Const) of the equation (4) without preamble and with transmission power of each payload free of the error correction to the payload as 0 dB. FIGS. 8 through 10 respectively show those obtained by performing the error correction when the preamble is 0 byte and thereafter calculating carrier power required to maintain a $10^{-10}$ obit error rate for each header and a $10^{-8}$ bit error rate for each payload. The bit error rate of each header is one which conforms to a wired ATM standard and the bit error rate of each payload indicates the magnitude subjectively evaluated as being free of unnaturalness upon transmission of a moving picture.

FIG. 8 shows calculated values at the time that a transmission frame comprises one cell. FIG. 9 illustrates calculated values at the time that the transmission frame comprises two cells. FIG. 10 depicts calculated values at the time that the transmission frame is made up of three cells. In either case, the horizontal axis indicates a correction byte number tp at a payload part of the transmission frame and the vertical axis indicates the value of carrier power expressed in decibel units. Respective graphs respectively show $S^H$ (header transmission power) and $S^P$ (payload transmission power) at the time that a correction byte number $t_H$ at a header part of the transmission frame assumes 0, 3, 6 and 9. Since the header and payload parts are actually transmitted with the same power, $S^H$ and $S^P$ are equal to each other. Thus, the transmission of the transmission frame needs transmission power S greater than any large one of $S^H$ and $S^P$ determined when the payload correction byte number tp is defined as t1 and the header correction byte number $t_H$ is defined as t2. When tp=3 and $t_H$=6 in the case of one cell (see FIG. 8), for example, $S^H$ results in −3.8 dB and $S^P$ results in −2.4 dB. Therefore, the transmission power S required to transmit the transmission frame becomes −2.4 dB.

The minimum value of the transmission power S required in the case of one cell and the header and payload correction byte numbers at that time can be determined from FIG. 8. When $t_H$ (header correction byte number) is given, an intersection of $S^H$ and $S^P$ minimizes the transmission power S. Referring to FIG. 8, the transmission power is −2.7 dB at tp=3 when $t_H$=3, the transmission power is −3.2 dB at tp=7 when $t_H$=6 and the transmission power is −3.1 dB at tp=13 when $t_H$=9. By making comparisons between them, the header correction byte number and the payload correction byte number used to minimize the transmission power S can be determined.

If calculated in this way, it is then understood that the minimum value of the transmission power S of the transmission frame in the case of one cell results in −3.4 dB, whereas the minimum value of the transmission power S reaches −4.0 dB or less in the case of two cells and takes −4.5 dB or less in the case of three cells. Namely, the transmission power required to satisfy a given bit error rate can be reduced by forming the transmission frame from a plurality of ATM cells.

Namely, a low-power communication system can be implemented by using, as variables, the byte number, the header correction byte number, the payload correction byte number and the number of multiplexed ATM cells all of which are deleted from the header part as the redundancy information and selecting all or some of these variables so as to minimize the transmission power required to meet the required bit error rate.

The embodiment of the present invention has described, as an illustrative example, the case in which the transmission frame according to the present invention is applied to the radio zone. However, the transmission frame according to the present invention is applicable even to a wired section or zone. Thus, when error characteristics of a transmission zone are poor, transmission fit to the error characteristics can be made to the wired zone. In this case, the configuration of the terminal station will be explained based on FIG. 3. The terminal station has a wired interface for outputting a transmission frame to a wired zone in place of the radio part 705. The conversion of an ATM cell or packet to a transmission frame is performed by the baseband pat 701. The produced transmission frame is outputted to its corresponding wired zone through the wired interface.

According to the present invention, as has been described above, transmission efficiency can be improved by collectively transmitting a plurality of packets and omitting redundancy information at header parts.

Further, the separate forward error corrections to the header and payload parts of the plurality of packets in a mass make it possible to reduce carrier power required to meet the demands for the bit error rates with respect to the header and payload parts as compared with the case in which the transmission frame is transmitted with one packet or ATM cell.

Moreover, the assembling of a header part of a frame from headers of packets (ATM cells) permits succession to a packet or ATM cell structure beyond a frame transmission zone.

It is further understood by those skilled in the art that the foregoing description is a preferred embodiment of the disclosed device and that various changes and modifications may be made in the invention without departing from the spirit and scope thereof.

What is claimed is:

1. A communication method suitable for use in a communication system comprising a base station for transmitting data therefrom and receiving data therein through the use of a plurality of packets each having a header including destination information and a payload storing the data therein, and a terminal station for communicating with said base station through a communication channel, comprising the steps of:

multiplexing a plurality of input packets into a transmission frame and transmitting the transmission frame; and outputting the plurality of packets restored from the received transmission frame;

said transmission frame including a preamble, a frame header part, a frame header part error correction code, a frame payload part and a frame payload part error correction code, said frame header part being formed from respective headers of said plurality of packets, and said frame payload part being formed from respective payloads of said plurality of packets.

2. A communication method according to claim 1, wherein said frame header part comprises a destination and information inherent in packets, said information being extracted from the respective headers of said plurality of packets.

3. A communication method according to claim 1, wherein said frame header part error correction code comprises an error correction code stronger than said frame payload part error correction code in error correction force.

4. A communication method according to claim 1, wherein the number n (integers of n≧1) of the packets constituting the transmission frame, a byte number $t_H$ of the error correction code added to said frame header part and a byte number tp of the error correction code added to said frame payload part are selected so as to minimize transmission power required for transmission of said transmission frame.

5. A communication method according to claim 2, wherein said each packet is an ATM (Asynchronous Transfer Mode) cell.

6. Communication equipment suitable for use in a communication network for transmitting a plurality of packets each having a header including destination information and a payload storing data therein, comprising:

a transmitting interface for multiplexing the plurality of packets so as to generate a transmission frame; and a receiving interface for restoring the original plural packets from the transmission frame with the multiplexed plural packets;

said transmitting interface including, a header analyzing part for analyzing the header of said each packet;

a data coupling part for coupling the headers of the packets to each other to thereby generate a frame header part and coupling the payloads corresponding to the headers to each other to thereby generate a frame payload part;

an error correction addition part for adding an error correction code to the frame header part and adding an error correction code to the frame payload part; and a preamble addition part for providing a preamble; and said receiving interface including, an error correction circuit for performing an error correction based on the error correction code added to the frame header part and an error correction based on the error correction code added to the frame payload part; and a packet reconstruction part for taking out headers and their corresponding payloads divided into the frame header part and the frame payload part to thereby reconstruct the packets.

7. Communication equipment according to claim 6, wherein said transmitting interface further includes an elimination part of header redundancy information for eliminating redundancy information of each header, said data coupling part couples the redundancy information-free headers to each other to thereby generate a frame header part, and said packet reconstruction part further provides redundancy information to thereby reconstruct the packets.

8. Communication equipment according to claim 7, further including a receiving packet interface for checking error correction control applied to a header of a received packet, and a transmitting packet interface for applying error correction control to the headers of said restored packets.

9. Communication equipment according to claim 6, wherein the error correction code added to the frame header part consists of an error correction code stronger than that added to the frame payload part in error correction force.

10. Communication equipment according to claim 6, wherein the number n (integers of n≧1) of the packets multiplexed into the transmission frame, a byte number $t_H$ of the error correction code added to the frame header part and a byte number tp of the error correction code added to the frame payload part are selected so as to minimize transmission power required to transmit the transmission frame.

11. Communication equipment according to claim 7, wherein said communication network is an ATM (Asynchronous Transfer Mode) network.

* * * * *